United States Patent [19]
Kelsey

[11] Patent Number: 5,967,289
[45] Date of Patent: Oct. 19, 1999

[54] ELECTROMAGNETIC SWITCH FOR DIVERTING OBJECTS IN HIGH SPEED CONVEYORS

[75] Inventor: Richard W. Kelsey, Westchester, Ohio

[73] Assignee: Ziniz, Inc., Louisville, Ky.

[21] Appl. No.: 09/026,926

[22] Filed: Feb. 20, 1998

Related U.S. Application Data

[60] Provisional application No. 60/040,505, Mar. 6, 1987.

[51] Int. Cl.⁶ .................................................. B65G 47/46
[52] U.S. Cl. .............................. 198/370.02; 198/370.03
[58] Field of Search ........................ 198/370.01, 370.02, 198/690.1, 370.03

[56] References Cited

U.S. PATENT DOCUMENTS

| | | |
|---|---|---|
| 3,710,923 | 1/1973 | Fromme et al. . |
| 4,013,551 | 3/1977 | deFeudis . |
| 4,711,341 | 12/1987 | Yu et al. . |
| 4,732,259 | 3/1988 | Yu et al. . |
| 5,732,814 | 3/1998 | Owczaszak et al. ........... 198/370.02 X |

*Primary Examiner*—James R. Bidwell
*Attorney, Agent, or Firm*—Wheat, Smith & Beres, PLC; Vance A. Smith

[57] ABSTRACT

A pusher switch assembly for diverting pushers from a first path to a second path includes an electromagnet that when energized attracts a ferrous portion of selected pushers and disengages the selected pusher from the first path so as to divert it to the second path.

12 Claims, 11 Drawing Sheets

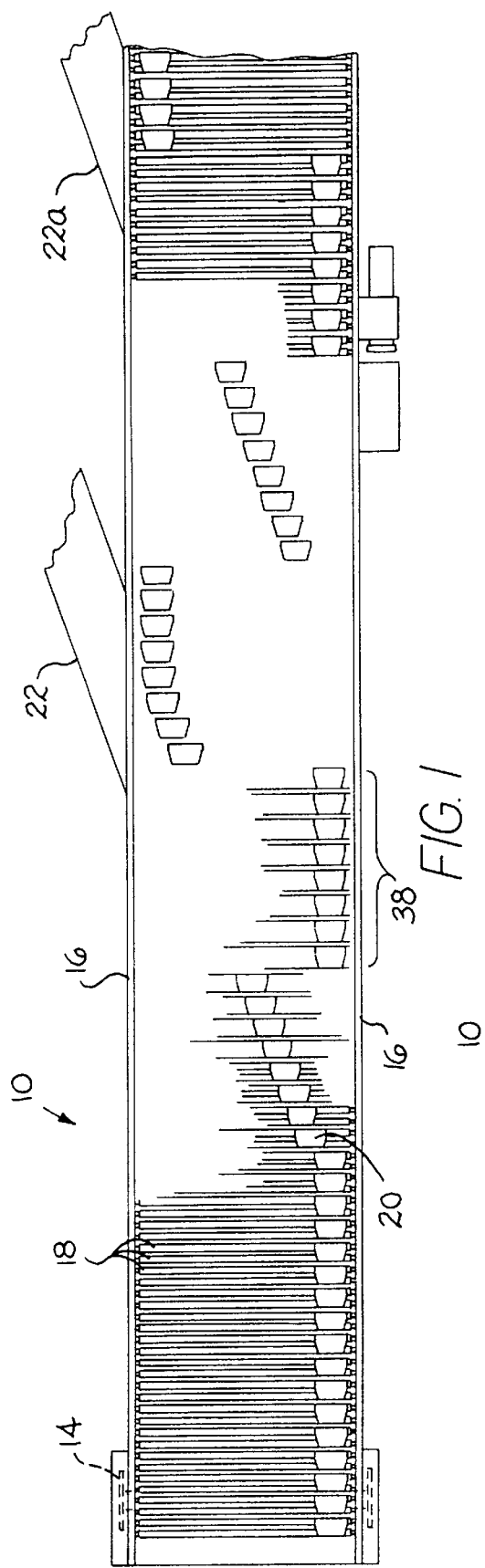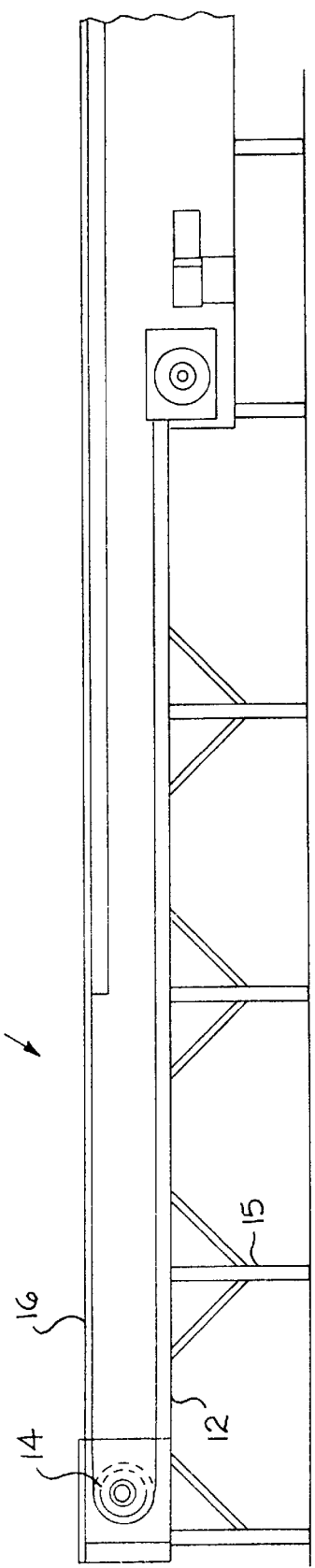

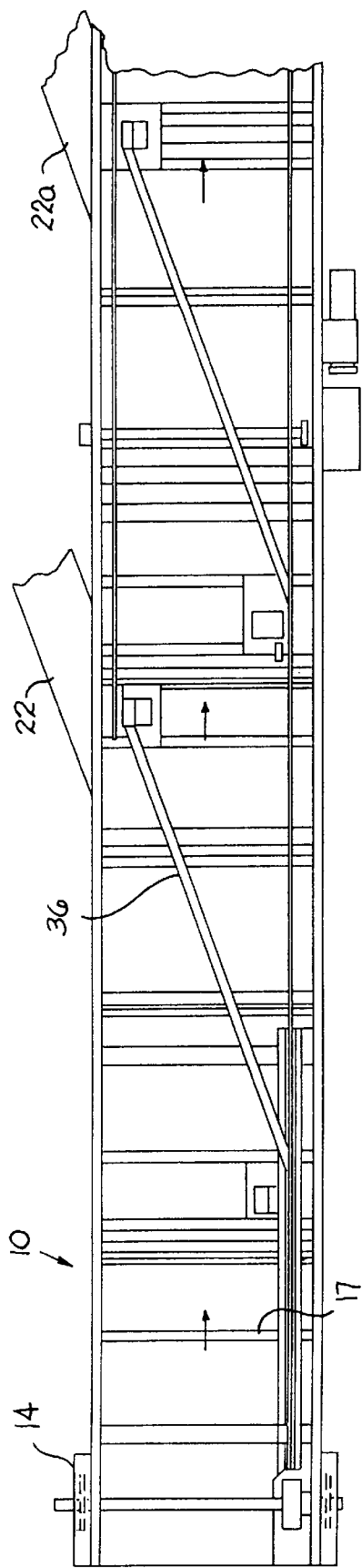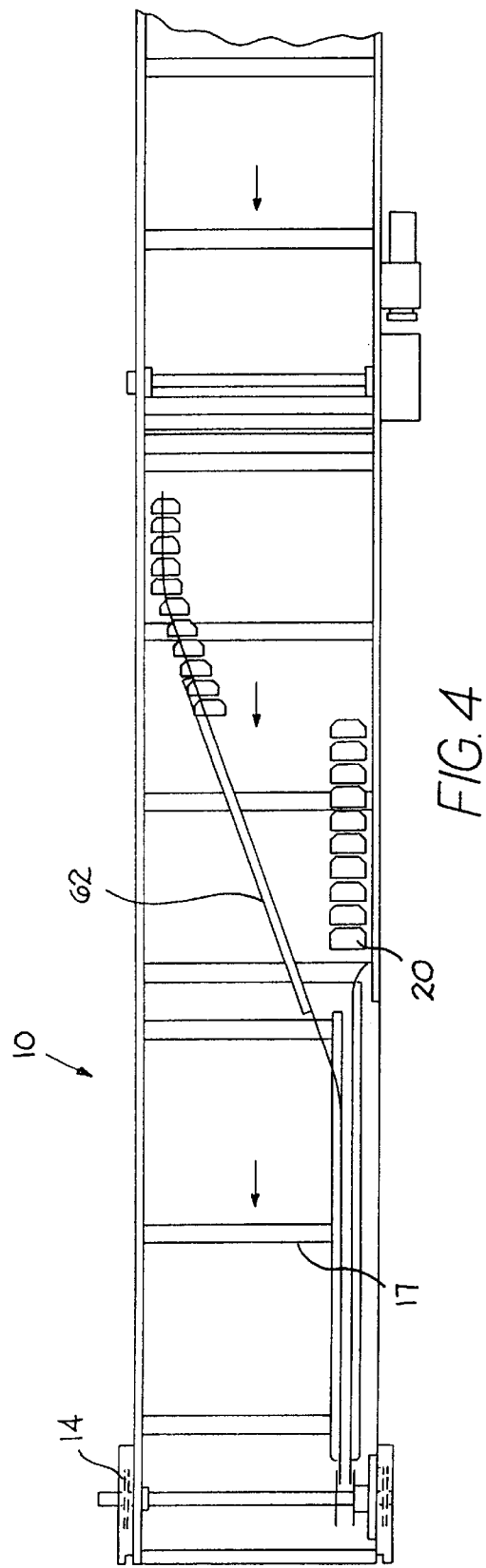

ELECTROMAGNETIC SWITCH FOR DIVERTING OBJECTS IN HIGH SPEED CONVEYORS

This application claims priority from U.S. patent application Ser. No. 60/040,505 filed Mar. 6, 1987.

BACKGROUND OF THE INVENTION

The present invention relates to conveyor systems capable of diverting objects from a high speed conveyor to one or more diverting conveyors and, more particularly, to conveyor systems with switch assemblies capable of diverting selected objects being carried at high speeds by the main conveyor to a diverting conveyor.

In the quest for high speed sortation of packages and the like to various and different destinations, increasing use is being made of central or main conveyors coupled with bar code reading devices and with one or more diverting conveyors. As selected objects identified by the bar code readers approach a diverting conveyor path, object diverting shoes associated with the main conveyor are activated, move across the main conveyor path, and guide the selected objects to a selected diverting conveyor. The shoes move with the conveying surface but are caused by a switching mechanism, when activated, to slide across the conveying surface along a diagonal guide path toward a diverting conveyor. Various mechanically operated switches are typically used to cause the shoes to be diverted from a normal forward movement to move laterally across the conveyor path. At high conveyor speeds, the time window for the switch assembly to be activated and divert selected shoes to the diagonal guide path is very small, less than about 16 milliseconds. While there are mechanical movement switch assemblies that can accomplish this, such assemblies tend to be complex and expensive. Moreover, those assemblies add significantly to the noise of the conveyor operation because of the mechanical movement.

It is therefore a paramount object of the present invention to provide for a simple switch that can be activated and deactivated well within the time window required by today's high speed sorting and/or diverting conveyors. It is still another important object of the present invention to provide for a switch usable with such conveyors but limiting the level of the noise added by the operation of the switch assembly and shoes. These and other objects will become apparent following a reading of the accompanying description and drawings.

SUMMARY OF THE INVENTION

The present invention pertains to a conveyor assembly that has a main conveyor and one or more diverting conveyors positioned at an angle with and intersecting the main conveyor. The assembly includes a plurality of article pushers operatively connected to components of the main conveyor and, in a non-diverting state, move with the main conveyor. The pushers are also able to move laterally across the main conveyor when placed in a diverting state. At least a portion of each pusher is comprised of ferromagnetic material. A first guide path, essentially parallel with the main conveyor, is in an operative relationship with the pushers and guides the pushers when in a non-diverting state. The assembly is also provided with at least one second guide path positioned at an angle with and having a first distal or receiving end positioned adjacent to the first guide path. A second distal or dispensing end of the guide path is positioned adjacent to the diverting conveyor. The second guide path has an operative relationship with a selected one or more of the pushers for guiding such pushers toward the second conveyor when the pushers are in a diverting state. A pusher switch is used to place the diverters in the diverting state and comprises an electromagnet that when energized attracts the ferrous portion of the pushers and disengages the pushers from their operative relationship with the first guide path and places the pushers into the operative relationship with the second guide path (the diverting state) whereby the pushers move parallel to the second guide path and push articles across the main conveyor to the diverter conveyor.

DESCRIPTION OF THE DRAWING

FIG. 1 is a top elevation of a diverting conveyor assembly using an electromagnetic switch in accordance with the present invention;

FIG. 2 is a side view of the diverting conveyor assembly of FIG. 1;

FIG. 3 is a top view of the diverting conveyor assembly of FIG. 1 without the conveying rollers;

FIG. 4 is a bottom view of the diverting conveyor assembly of FIG. 1;

DETAILED DESCRIPTION OF THE PREFERRED EMBODIMENT

Figure 5:
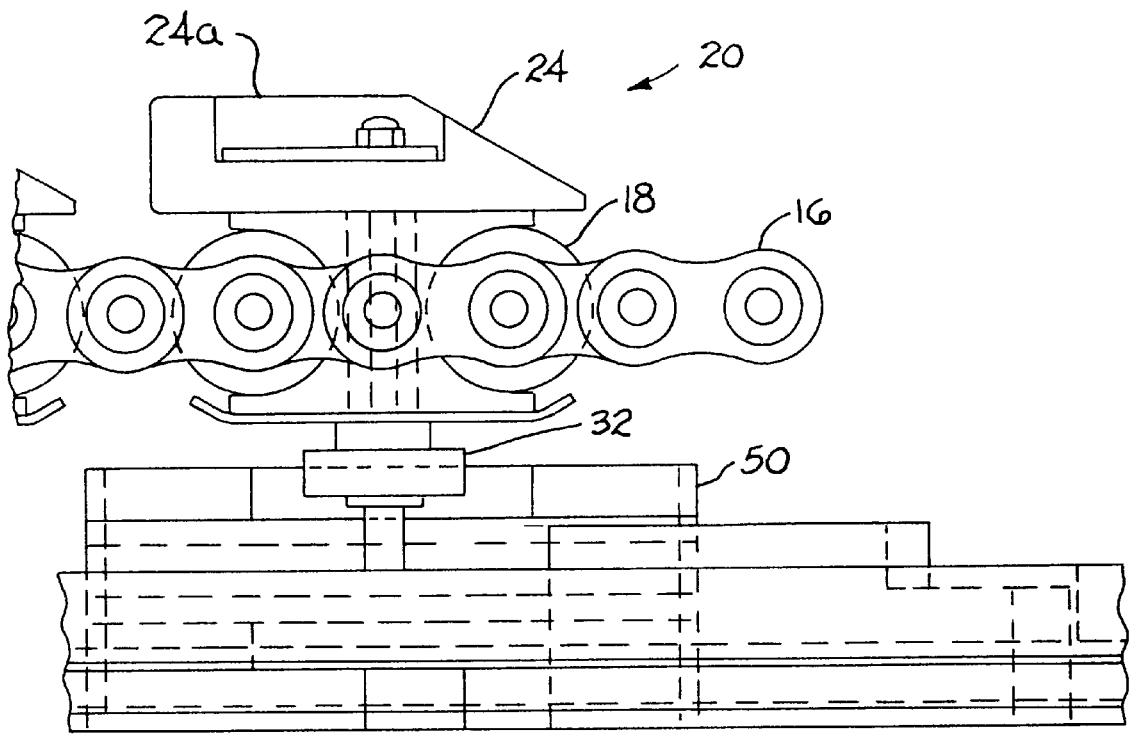
FIG. 5 is a sectional of a guide shoe positioned adjacent an electromagnetic switching station in accordance with the present invention.
Figure 5A:
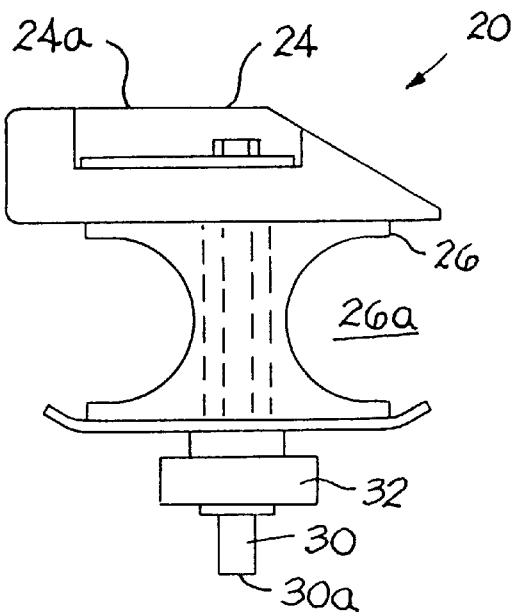
FIG. 5a is a side view of the shoe illustrated in FIG. 5.

Reference is initially made to FIGS. 1–4 and 6 for a general overview of a conveyor assembly incorporating the present invention. The main conveyor 10 has a frame structure 12 including side rails 13 (best seen in FIG. 6), upright support rails 15, and cross rails 17 appropriately bolted, welded, or otherwise fastened together. The side rails 13 rotatably support a plurality of sprockets 14 that drive an endless chain 16 being appropriately shield on both sides of the frame structure 12 just inside the adjacent side rails 13. A plurality of flight tubes or rollers 18 are positioned between and rotatably attached to the flights of the endless chains 16, forming a conveying surface for articles that are being transported by the conveyor assembly. A plurality of article pushers or shoes 20 are mounted in a manner, described below, so as to normally move with the rollers 18, but when in a diverting state, are slidable relative to and laterally across the rollers 18. The conveyor assembly also includes at least one diverting conveyor 22 and, in many instances, one or more additional diverting conveyors 22a, to receive articles pushed laterally across the surface of conveyor 10 by pushers 20.

Figure 6:
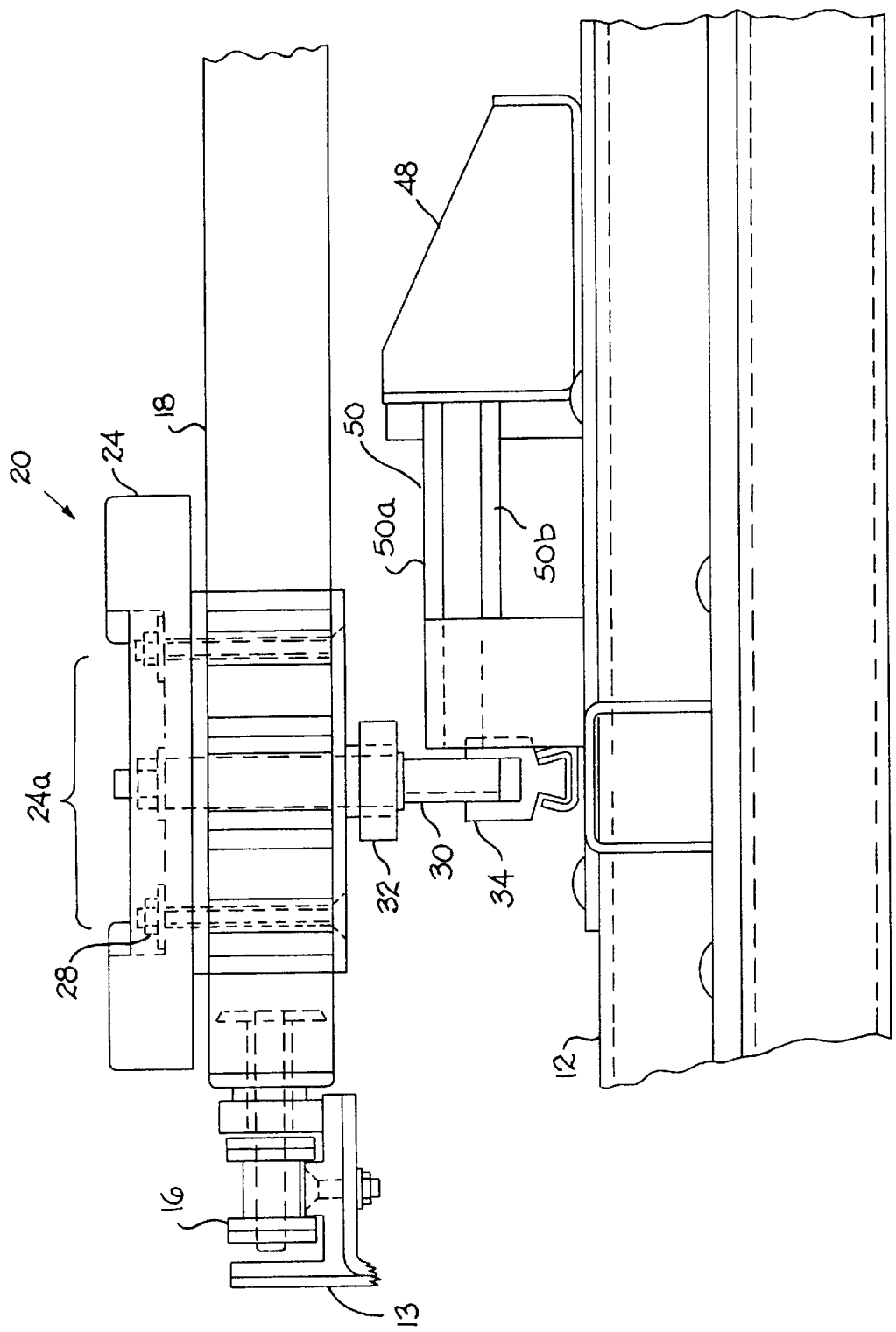
FIG. 6 is a front sectional view of a guide shoe positioned adjacent an electromagnetic switching station in accordance with the present invention.

The structure of the shoes 20 is best seen in the views of FIGS. 5 and 6. Shoes 20 include a wedge shaped pusher 24 that rises above the conveying surface defined by rollers 18 and functions to abut and move selected articles being conveyed by the conveying surface. A plurality of threaded bolts 28 extend from a recess 24a centrally located on each pusher 24 into the body of a pedestal support 26. Support 26 has a double concavity 26a adapted to compliment the surfaces of adjacent rollers 18 and hold the shoes 20 in place as the rollers 18 are being driven forward. The double concavity 26a further permits the shoes 20 to move laterally relative to the conveyor path when the shoe 20 is not otherwise constrained against such movement. A guide pin 30 is bolted to pusher 24 between bolts 28 in recess 24a and extends downwardly terminating in a free distal end 30a. A wheel bearing member 32 is rotatably mounted on pin 30 at a position intermediate the distal end 30a and the bottom of the pedestal 26. Pushers 24 are typically formed from a material such as urethane while the pedestals 26 may be comprised of a material such as delrin. The guide pins 30 are preferably formed from cold-rolled steel, a ferromagnetic material, while the wheel bearing member 32 may be made from a delrin-like material also.

Figure 8A:
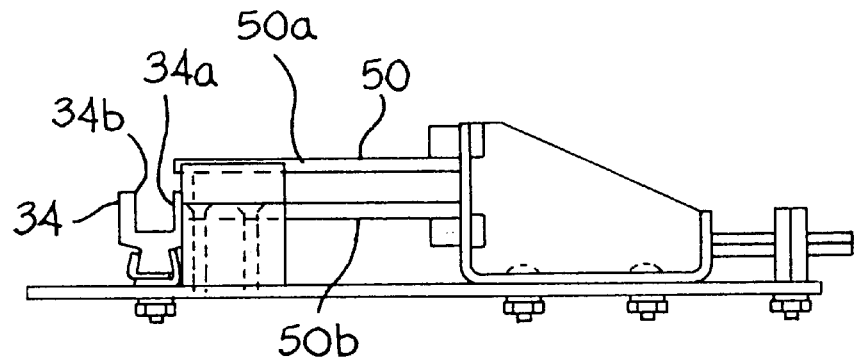
FIGS. 8a, 8b, and 8c are sectional views taken along respective lines 8a—8a, 8b—8b, and 8c—8c in FIG. 7.
Figure 8B:
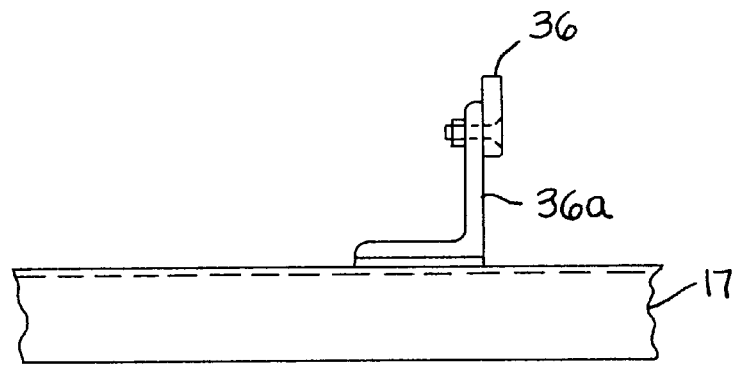

As best seen in FIG. 8, a pair of guide rails or channels 34 and 35 are appropriately bolted at intervals to frame structure 12 on each side of main conveyor 10. Each channel 34 and 35 has a sectional shape with respective upright interior and exterior walls 34a, 34b and 35a, 35b (shown in FIGS. 8a and 8b, respectively) defining the channel configurations into which the distal end 30a extends, thus preventing the shoes 20 from moving laterally across the conveyor width when the system is in a non-diverting mode. In such non-diverting mode, the shoes 34 continuously move along that side of the conveyor in a line as shown in the bracketed portion depicted by character numeral 38 in FIG. 1.

Figure 7:
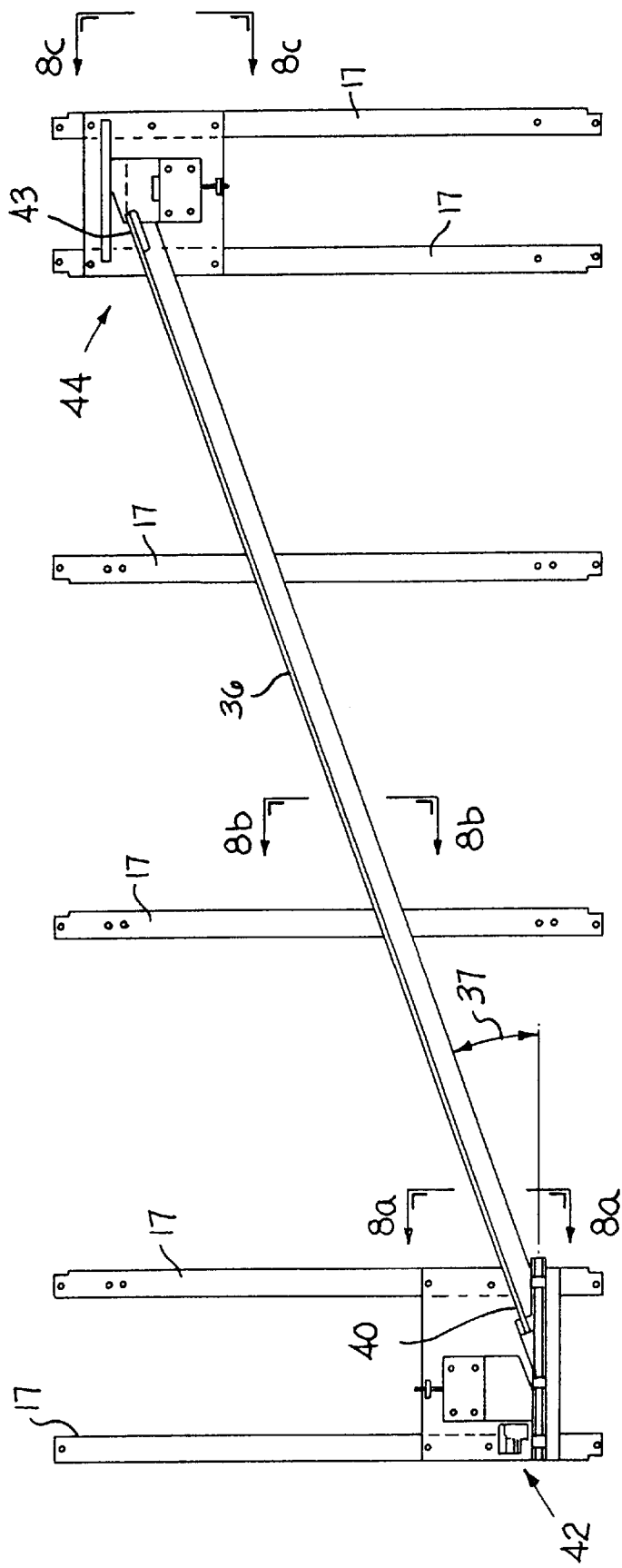
FIG. 7 is a top schematic view depicting dispensing and receiving switching stations depicting the guide rails therebetween in accordance with the present invention.

To provide for diversion of packages, the conveyor assembly has one or more angled guide rails 36 secured to the frame structure beneath rollers 18. The rails 36, best illustrated in FIGS. 3 and 7, are positioned at an angle 37 at no more than about 20° to the direction of conveyor movement. The receiving end 40 of guide rails 36 are positioned close to a shoe switching station 42 while the other or dispensing end 43 is positioned near the shoe switching station 44. In the sectional view of FIG. 8, it may be seen that each angled guide rail 36 takes the form of a right angle bracket with an upright arm 36a serving as a bearing surface for the wheel bearing member 32 of each shoe 20 that has been diverted from its normal conveying path along guide channel 34.

To best describe the specifics of the shoe switching station 42, reference is made to FIGS. 8a, 8c, 9 and 10. The support structure for the switching station 42 is a plate 46 (FIG. 9) secured to the assembly frame below rollers 18. A bracket 48 is mounted to the plate 46 and can be adjusted to move horizontally toward and away from the adjacent guide channel 34. A set screw 49 provides for fine adjustment of the bracket 48. An electromagnet 50 is bolted to the horizontally movable bracket thereby providing for relative movement between channel 34 and electromagnet 50.

Figure 8C:
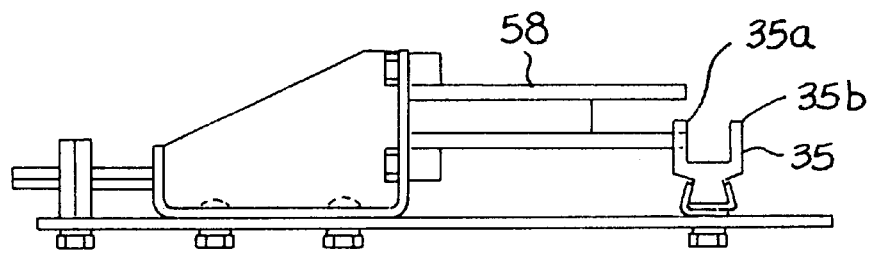
Figure 9:
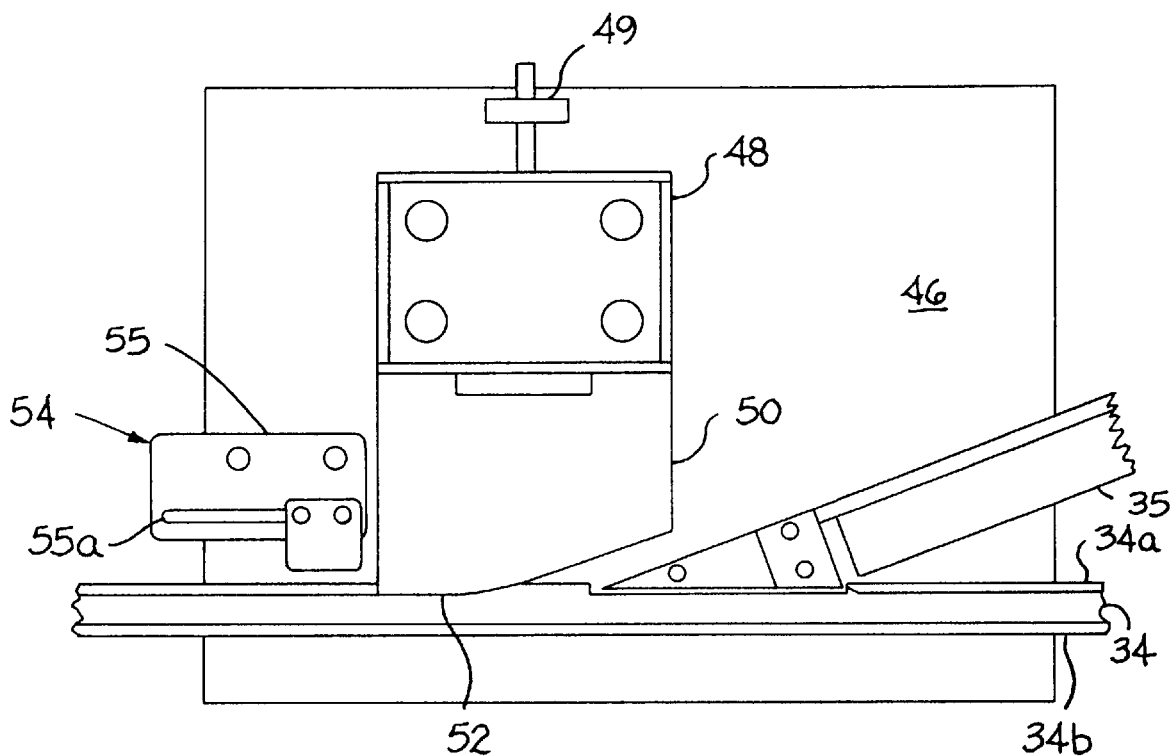
FIG. 9 is a top view of a diverting switching station with an electromagnetic switch in accordance with the present invention.
Figure 9A:
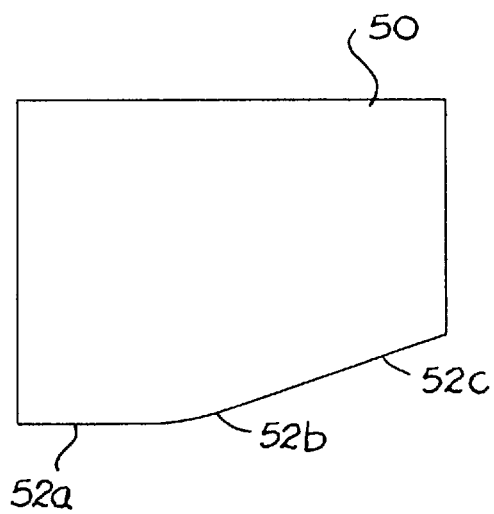
Figure 10:
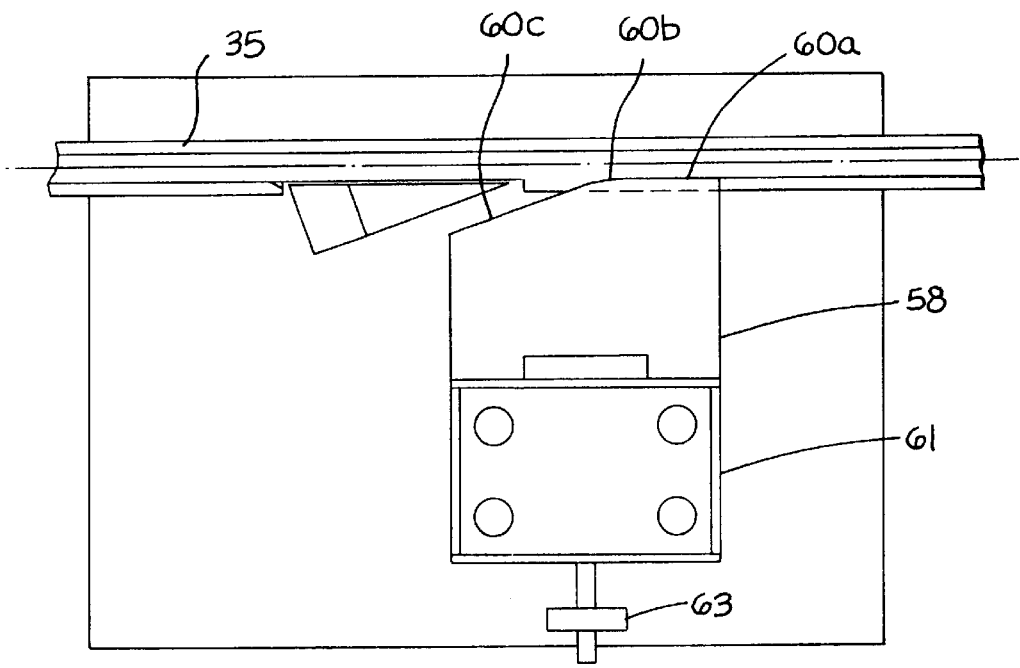
FIG. 10 is a top view of a receiving switching station with an electromagnetic switch in accordance with the present invention.
Figure 11:
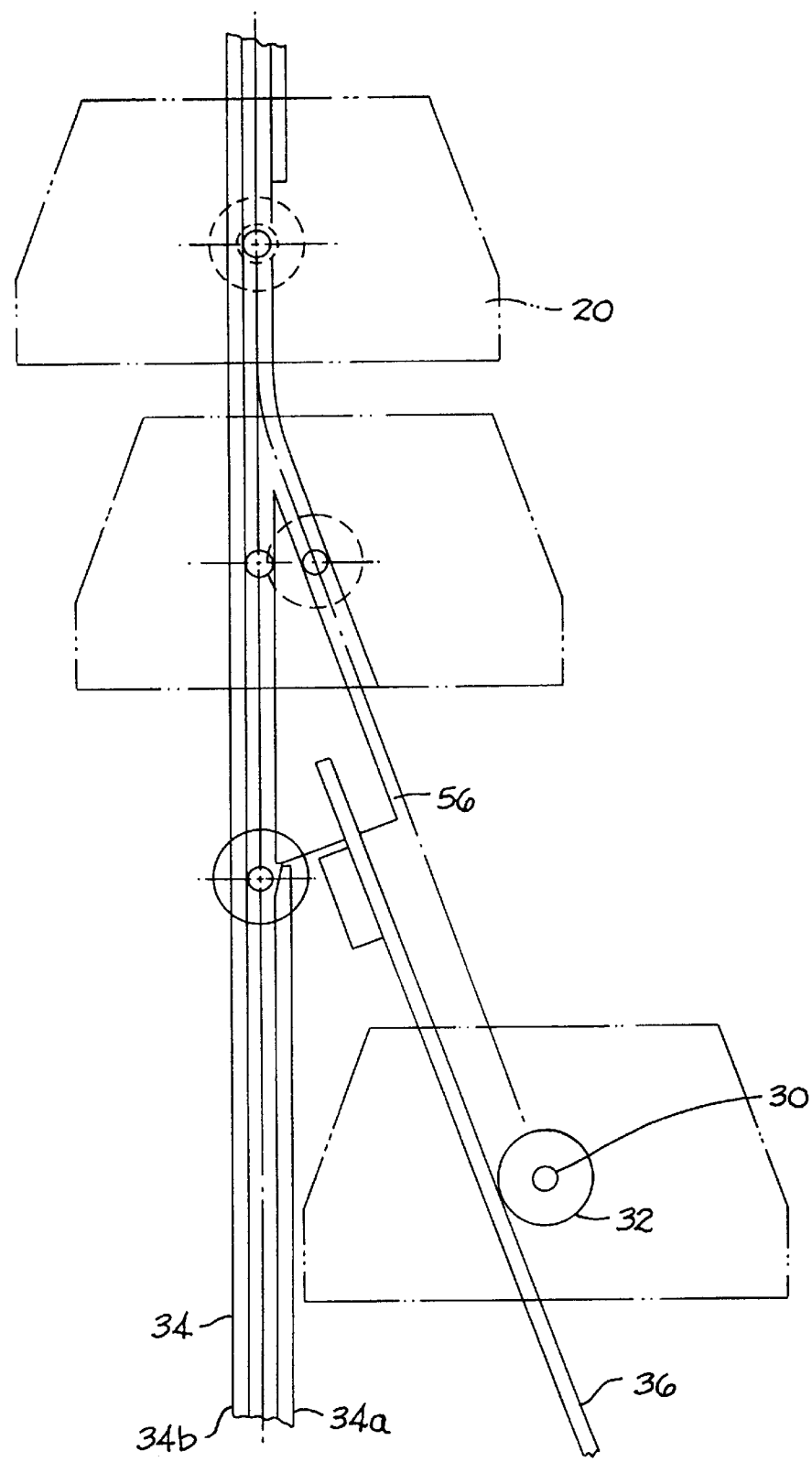
FIG. 11 is a top schematic view showing the movement of a shoe during switching at a diverting switching station with an electromagnetic switch in accordance with the present invention.

While the internal structure of the electromagnet is a matter of choice, the electromagnet 50 may comprise a pair of upper and lower, spaced plates 50a and 50b as seen in FIGS. 8a and 8c. The plates are made of ferromagnetic material between which are positioned the energizing coils (not shown). The space between the plates 50a and 50b may be filled with an epoxy material to make the magnet a single unit. The edges of plates 50a and 50b define a diverting surface 52 facing the pins 30 of the passing shoes 20 and form a part of the channel guide 34. Specifically, the diverting surface 52 has a flat portion 52a that interrupts a portion of the interior upright channel wall 34a of the channel 34 and forms with the exterior upright channel wall 34b that portion of the channel 34 facing the electromagnet magnet 50. Surface 52 additionally has a curved portion 52b with a predetermined radius of curvature that curves away from the channel 34 toward the cross guide rail 36 and finally a second flat portion 52c that is essentially parallel with rail 36. A sensing element 54 is positioned near, but "upstream" from, electromagnet 50. The distance of sensing element 54 from the magnet is adjustable along a slot 55a in the plate 55 bolted to support plate 46. When the electromagnet is energized, the ferrous material comprising the pin 30 is attracted by the ensuing magnetic field and causes the pin to abut and follow the surface 52 along portions 52a, 52b, and 52c until surface 52 terminates. A wedge shaped channel separator or divider 56 secured to the frame 12 functions to provide continuity to channel 34 on one side and, collectively with the surfaces 52b and 52c, to define an angled channel for the pin 30 attracted by the energized electromagnet 50. Movement of the electromagnet 50 through adjustment of set screw 49 allows for fine adjustment to the magnitude of attraction of the electromagnet to the ferromagnetic material of the pins 30 as desired. When the pin 30 leaves surface 52, divider 56 continues to guide the pin 30 to the start of cross rail 36. As perhaps best seen in FIG. 9, the divider 56 and rail 52 overlap slightly. At this point, the wheel bearing member 32 abuts the cross guide rail 36 and the shoe 20 follows rail 36 across the conveyor path. This sequence can best be understood by a review of the movement illustrated in the schematic of FIG. 11.

The radius of curvature of the curved surface part 52b plays a significant role, particularly at the upper range of speeds of the conveyor. An abrupt change of direction of a diverted pusher is not desirable because of the resulting noise and wear and/or structural damage that occurs to the pins 30, bearing members 32, and rails 36 over time. Thus, by providing a curvature that guides the movement of the pin 30, the pin 30 moves from the direction imposed by guide channel 34 to the direction provided by rail 36 in a graduated manner. The radius of curvature required is dependent to a large degree on the conveyor speed and strength of the electromagnet. As a general rule, small radii of curvature require larger electromagnetic forces to counter the higher centrifugal forces of the pin moving in the tighter curve path. On the other hand, larger radii of curvature increase the total switching time. Applicant has found that a radius of curvature of between four to sixteen inches is sufficient for most applications.

During its lateral movement, each shoe 20 experiences an increase in its velocity since the vector component in the direction of the movement of the conveyor remains the same. For this reason, large angles of diversion are not desired for high speed conveyors. Similarly, a significant impact can occur at the far side of the conveyor near the diverting conveyor where the shoe 20 is returned to the normal path parallel to the flow of the conveyor. The impact undesirably increases the operation noise, damage, and wear to a considerable extent. It is preferable to use a second switching station 44 that operates essentially the same as the first switching station 42 to receive shoes 20. Receiving switching station 44 may, however, employ a more gradual radius of curvature for guide surface 60. The field created by the electromagnet 58 attracts the pin 30 against surface 60 leaving the dispensing end 40 of guide rail 36 where it follows the curvature of surface 60 to the far side guide channel 35. Because the pin 30 does not impact against channel 35, but follows surface 60 into the channel, large impact noises are avoided. Since the receiving switching station 44 does not have to be selective, the electromagnet 58 may remain energized continuously during the entire conveyor operation. Like the electromagnet 50 of the first switching station 42, electromagnet 58 is horizontally adjustable relative to the side guide, i.e., channel 35, through a slidable plate 61 and a set screw 63.

When the rollers 18 and shoes 20 are moved around the end sprockets 14 underneath the conveyor 10, those shoes 20 that were directed to the guide channel 35 must be laterally moved again to guide channel 34 before the rollers 18 reappear again to form the conveying surface for articles. As shown in FIG. 4, a single angled guide rail 62 having a structure similar to or identical to the structure of rail cross guide rails 36, may be used along with electromagnetic switching stations above to lessen impact noise. However, it should be understood that since no rapid diversion of articles is required, switching does not have to accomplished with the same rapidity and no selectivity is required.

Figure 12:
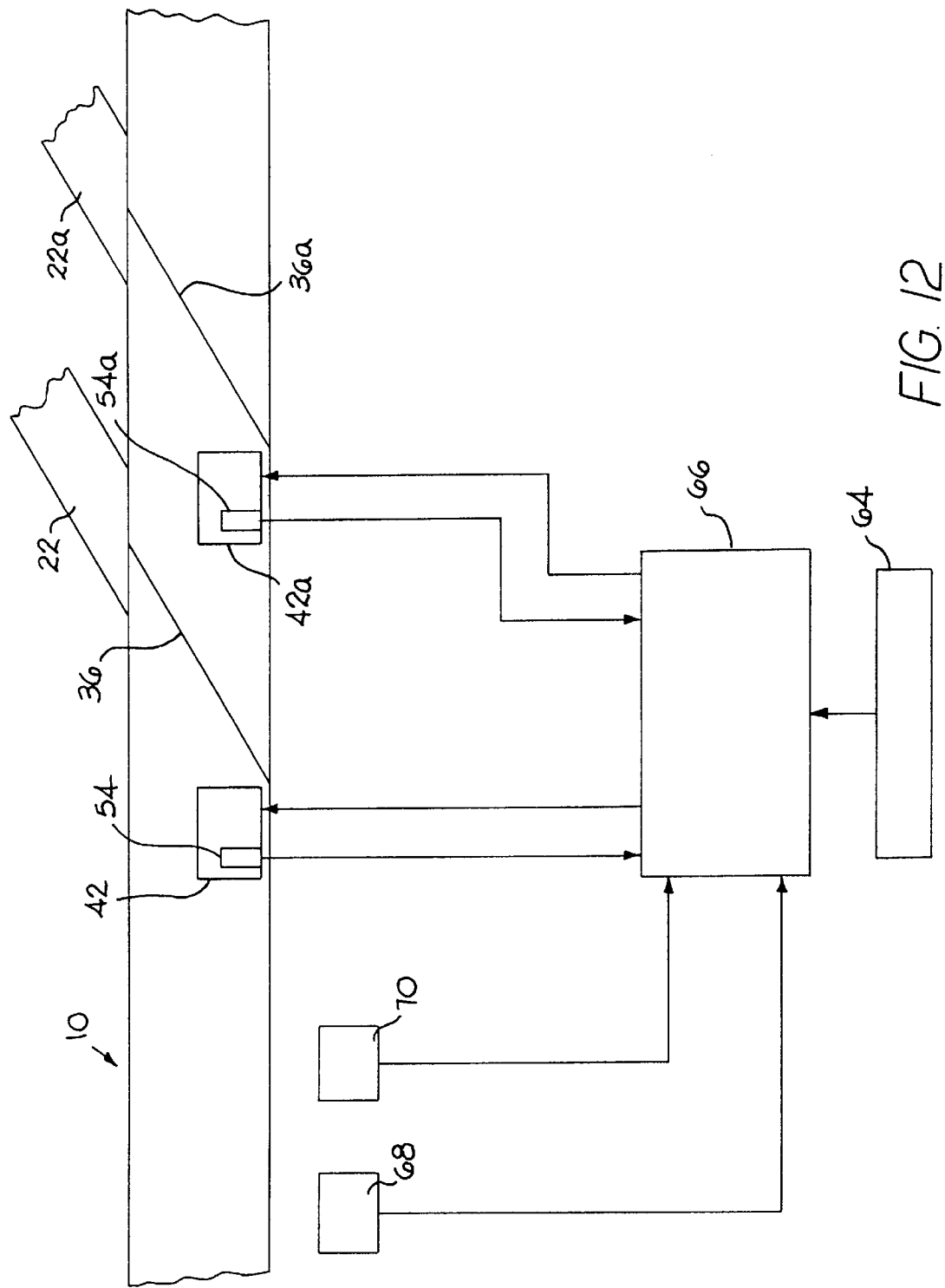
FIG. 12 is a flow chart depicting a mode of operation of a conveyor assembly using a switching station with an electromagnetic switch in accordance with the present invention.

As stated above conveyor speeds of up to 600 feet per second may be used. Thus, the window for diverting the path of an article is typically quite small, e.g., on the order of five to sixteen milliseconds. Accordingly, the decision to divert must be made at some time interval prior to the energization of the electromagnetic switch at the chosen switching station. The flow diagram and schematic of FIG. 12 illustrates one example of a control system that may be used with the electromagnetic switching stations. In this example, a determination is made that all packages entering the main conveyor 10 with a code ABC are to be diverted to the conveyor 22 and all packages with a code XYZ are to be diverted to the conveyor 22a. This information is encoded at user input station 64 into a controller such as a computer 66. The computer 66 also receives inputs as to conveyor speed, package size, and other such parameters. The entry of a package into the conveyor is sensed by a sensor 68, such as a photocell, and relayed to the computer 66 so that the package position is known. A reader 70, such as a bar code reader, determines whether or not the package bears the codes ABC or XYZ. The adjustable sensor 54 positioned just upstream of the electromagnet of switching station 42 senses and counts the passage of the pushers and provides a running count to the computer 66. When the appropriate and predetermined count is reached, the electromagnet of switch station 42 is energized prior to the moment when the package bearing the code ABC reaches station 42. The electromagnet of switching station 42 is continues in an energized state for a predetermined time interval necessary for the appropriate number of shoes 20 to be diverted and engage the article or articles. The diverted shoes 20 move along the cross guide 36, thereby pushing the package in that direction toward switching station 44 and conveyor 22. At switching station 44, the diverted shoes are guided into guide channel 35, parallel to the main conveyor path. Packages bearing the code XYZ are similarly diverted at switch 42a toward conveyor 22a. All other packages continue along the main path of the conveyor 10.

Figure 13:
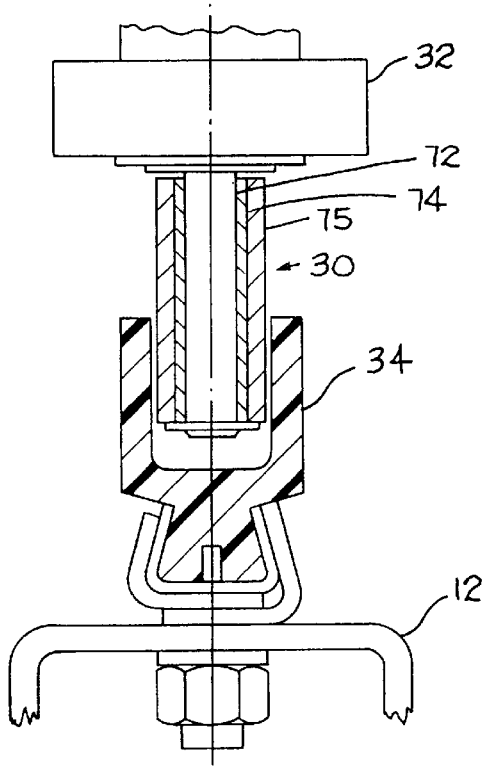
FIG. 13 is a side sectional view of an alternate structure of a pin in a shoe used with an electromagnetic switch in accordance with the present invention.
Figure 14B:
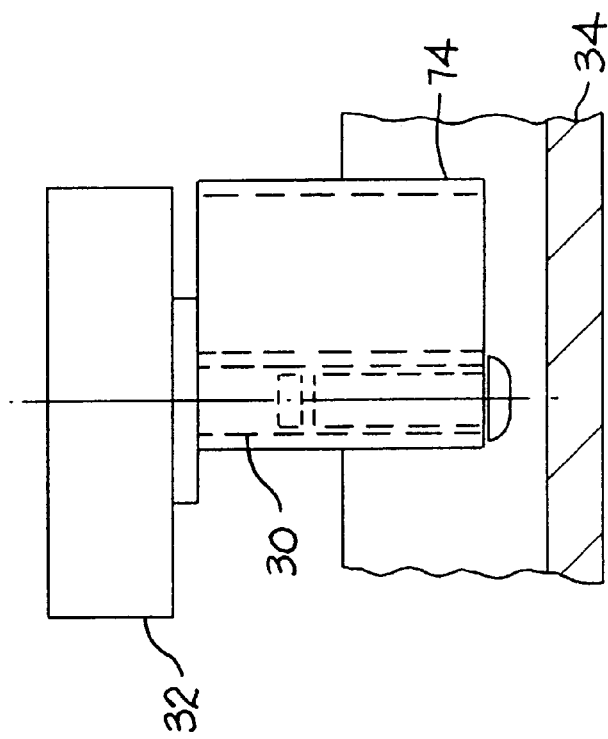
FIGS. 14a and 14b are sectioned views of still another alternate structure for a pin in a shoe used with an electromagnetic switch in accordance with the present invention.
Figure 14A:
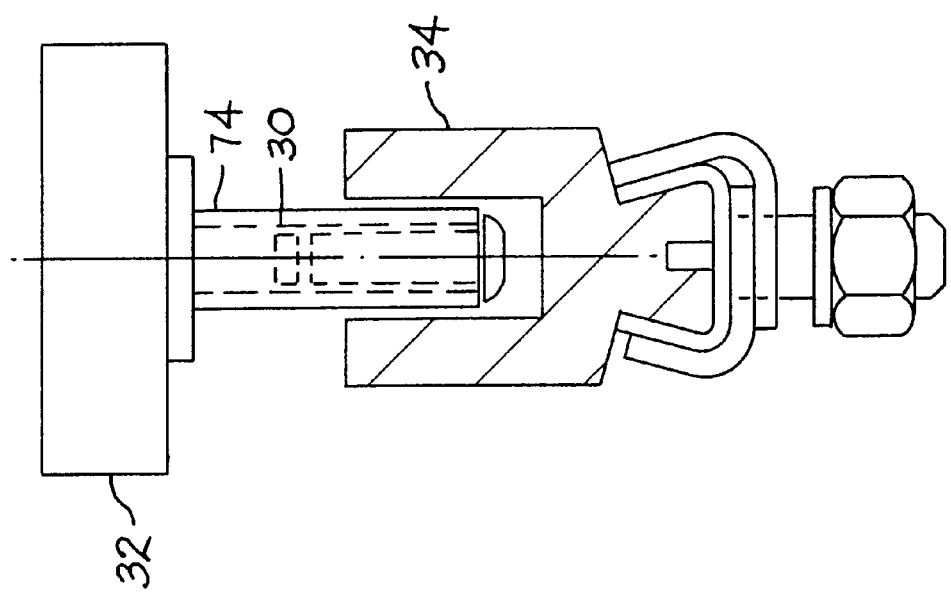

It should be understood from a reading of the above that a portion of the shoe must be comprised of a ferrous material that is attracted by the electromagnet. Preferably the guide pin of the shoe includes ferrous material. An alternate structure for a pin is shown in FIG. 13 in which the pin 30 comprises a steel core 72 clad by a layer of bearing material 73 followed by roller 75 made of a ferromagnetic material. The additional ferromagnetic material increases the attraction between the electromagnet and the pin 30. Still another alternative structure for the pin 30 is shown in the views of FIGS. 14a and 14b in which the pin 30 is provided with a flange or "flag" 74 that is made of ferromagnetic material. The flag 74 flag the pin 30 and projects behind the pin 30 within the channel guide 34 and increases the effective attraction of the pin 30 to an electromagnet of a switching station.

The present invention as described above, accompanied by the various figures addresses the objects and provides for solutions to problems posed by the high conveyor speeds and accompanying noise levels. Those with ordinary skill in the art will be able to devise changes and modifications without departing from the scope of the appended claims.

I claim:

1. A conveyor assembly including a main conveyor defining a first conveyor path and a second conveyor defining a second conveyor path, said second conveyor path being positioned at an angle with and intersecting said first conveyor path, said assembly comprising a plurality of article pushers operatively connected to components of said main conveyor for moving with said main conveyor, said article pushers including at least a portion thereof being comprised of ferromagnetic material;

a first guide path in a first operative relationship with said pushers for initially guiding said pushers in a direction parallel to said first conveyor path;

a second guide path positioned at an angle with and having one distal end positioned adjacent to said first guide path and a second distal end positioned adjacent to said second conveyor path, said second guide path in a second operative relationship with a selected one or more of said pushers for guiding said selected one or more of said pushers toward said second conveyor path when said pushers are in a diverting state; and a pusher switch assembly for diverting said selected one or more pushers from said first guide path to said second guide path thereby placing said one or more of said pushers in said diverting state, said assembly including an electromagnet that when energized attracts said ferrous portion of said selected one or more pushers and disengages said one or more selected pushers from said first operative relationship with said first guide path and places said one or more selected pushers in said second operative relationship with said second guide path, whereby said pushers move parallel to said second guide path and push articles to said second conveyor path.

2. The assembly of claim 1 in which said electromagnet has a face against which a portion of said pusher is attracted when said electromagnet is energized, said surface having a configuration that is essentially parallel to said first guide path along one part thereof and essentially parallel to said second guide path along a second part thereof, said face thereby providing a continuous abutting surface along which said pusher portion is guided from said first operative relationship with said first guide path to said second operative relationship with said second guide path.

3. The assembly of claim 2 in which said pusher portion comprises a pin and said first guide path is defined by a channel, said pin continuously following said channel when said electromagnet is not energized.

4. The assembly of claim 3 in which said pin is comprised of ferromagnetic material and abuts said electromagnet surface when said electromagnet is energized.

5. The assembly of claim 4 in which said pusher portion further comprises a bearing member and said second guide path comprises a rail, said bearing member abutting said rail when said pusher is in said second operative relationship with said second guide path.

6. The assembly of claim 5 including a sensing device for sensing the presence of a selected article at a point along said first conveyor path upstream of said pusher switch and energizing said electromagnet as said selected article approaches said pusher switch for a predetermined time period thereby placing at least one of said pushers in said diverting state and diverting the direction of movement of said selected article toward said second conveyor path.

7. A combination of an electromagnetic diverter switch and a conveyor assembly having a main conveyor, a diverting conveyor, and article pushers guided along a first guide path parallel to a main conveyor path in a non-diverting mode, and, in a diverting mode, said article pushers being guided along a second guide path angled across said main conveyor path for pushing a preselected article toward said diverting conveyor, said diverter switch comprising an electromagnet having a surface essentially parallel to said first guide path along a first part thereof and essentially parallel to said second guide path along a second part thereof, said pushers having a portion thereof comprising ferromagnetic material and, when said electromagnet is energized, abutting said first part and then said second part thereby causing said pushers to follow said second guide path across said main conveyor path.

8. The combination of claim 7 in which said first path is defined by a channel extending parallel to said main conveyor path, said portion of said pusher comprising a guide pin of ferromagnetic material that abuts said first part and then said second part when said electromagnet is energized.

9. The combination of claim 8 in which said first and second face parts are substantially flat and separated by a third part having a radius of curvature of between about four and sixteen inches.

10. The combination of claim 8 in which said second guide path is defined by a rail, said portion of said pusher further comprising a bearing member that abuts said rail.

11. The combination of claim 7 in which said electromagnet is horizontally adjustable with respect to said first guide path.

12. The combination of claim 7 including a plurality of diverting conveyors and a plurality of diverting switches, each of said diverting switches being associated with one of said diverting conveyors.

\* \* \* \* \*